United States Patent Office 3,247,385
Patented Apr. 19, 1966

3,247,385
DETECTING CONTAMINATION ON SURFACES
John Lynde Anderson, Orlando, Fla., assignor to Cleanometer Corporation, Wilmington, Del.
No Drawing. Filed Dec. 21, 1961, Ser. No. 161,247
10 Claims. (Cl. 250—106)

This invention relates to a new method of detecting contamination on surfaces and more particularly to the detection of contamination of metal or non-metallic origin on metal and other surfaces.

This case is a continuation-in-part of my application S.N. 78,283, filed on December 27, 1960.

The rapid and quantitative detection of contaminants of non-metallic origin either on metal surfaces or within spaces confined by metal surfaces, particularly contaminants which are present only in very small amounts, is not practicable using existing methods and techniques. Thus a method in general use involves the process of thoroughly wetting a metal surface with a solvent for the contaminant, of recovering the solvent quantitatively, and then of determining the amount of contaminant dissolved in the solvent. This method, however, determines only material which is removed from the surface and does not determine material which is left on, or is adjacent to, the surface after the test is completed. While it is known that the cleanliness of a surface can be determined by use of radioactive materials, the prior art methods, as, for example, that of Dvorkovitz et al. described in U.S. Pat. 2,968,733 are not adequate and not always operative, for the problem of contamination of metal surfaces often is a most serious one, particularly when the contamination may cause explosions or rapid, uncontrolled chemical reactions when in contact with other material for which the surface in its various forms is designed. For example, in handling liquid oxygen, it is essential that the amount of organic and other contamination of non-metallic origin on the metal surfaces over which the liquid oxygen is standing or through which it is transferred must be kept to the irreducible minimum and must be quantitatively determined prior to permitting the liquid oxygen to come into contact with the metal surfaces involved, in order to insure maximum stability and safety. Testing procedures which introduce or leave contaminants behind must be avoided.

It is, therefore, an object of this invention to provide a new and useful method for the detection of contamination on surfaces. Another object is the provision of a method for the detection of contaminants of non-metallic or organic origin on surfaces or within spaces confined by surfaces by a simple and economical method. A still further object is the provision of a method by which organic contamination on metal surfaces may be detected. Other objects will appear as the description of the invention proceeds.

These and other objects are accomplished in the present invention by exposing a surface to a radioactive labeled compound and by measuring the amount of radioactivity exhibited by the surface, the presence of contamination being demonstrated by an increase of radioactivity in the area of contamination over that which is detected in an area of original scrupulous cleanliness.

Another embodiment of my invention is accomplished by exposing the space enclosed by a surface to a radioactive labeled compound and by measuring the amount of radioactivity exhibited, the presence of contamination being demonstrated by an increase of radioactivity in the space enclosed by a surface when originally contaminated over that which is detected in a previously scrupulously clean space.

A preferred embodiment of my invention is accomplished by exposing a metal surface of the type designed for containing and transporting gases, liquids, and solids to a volatile radioactive labeled compound and measuring the amount of radioactivity exhibited by the surface, the presence of contamination being demonstrated by an increase in radioactivity from contaminated areas of the surface over those which are scrupulously clean, the contaminant generally being of non-metallic origin, if present.

In my invention a radioactive labeled compound is used which preferably is compatible and miscible with the type of contaminant which it is desired to detect although this condition is not required. The underlying principle on which the detection phase of my invention is dependent is the principle of increased surface area of non-metallic materials or other contaminants over those of the metallic surfaces normally used for storing and transporting gases, liquids, and solids. My invention is particularly useful in examining for contamination in multi-component, assembled systems which up to the present time have not been examinable in total.

The particular radioactive labeled compound selected for the process of my invention may react with contaminants or may be inert and simply be absorbed or absorbed more strongly by the contaminant than by the metal surfaces. In the event of reaction with the contaminant it is important that the radioactive portion of the radioactive labeled compound remain in or on the contaminant in order to provide the necessary increase in radioactivity which is detectable; if the selected radioactive labeled compound also tends to react with clean metal surfaces, there must be a greater degree of reaction with the contaminant.

The radioactive labeled compound which is a part of my inventive process is preferably applied and exposed to the surface being examined as a gas or as a vapor in order to facilitate exposure of all parts of the surface. Normally the residual gas which remains after the exposure is removed prior to detecting the radioactivity in order to provide a greater difference between the radioactivity of clean surfaces and contaminated ones. In the event that the radioactivity is applied as a solution or as a spray, it is sometimes of advantage to remove the solvent prior to determining the radioactivity.

The amount of radioactivity which is detectable in my inventive process is in general proportional to the amount of contamination originally present. The physical state and chemical nature of the non-metallic contaminant also affect to some degree the amount of radioactivity which is absorbed and therefore detectable. One type of contamination which is readily detected by my invention is often found on metal surfaces and arises from cutting and threading oils, from greases and protective hydrocarbons, and in other ways. Other types of contamination such as pieces of wood, cigars and cigarets, paper, and solid foods are also readily detected.

The particular radioactive labeled material employed in my inventive process is selected also for the type and energy of radiation emitted and for the ability to be absorbed readily by the contaminant, if any. The radioactive labeled compound is made radioactive by the presence of alpha, beta, or gamma emitters. In general for detection of contaminants within a system of surfaces compounds containing beta emitters are selected whereas detection through a metal surface usually requires hard betas or gammas. Some typical radiochemicals which are effective for my invention are butane-$C^{14}$, chlorine-36, phosphorus trifluoride-$P^{32}$, trichloroethylene-$C^{14}$, and the like; and compounds of reasonable volatility containing gamma emitting isotopes.

This invention will be further understood by reference

Example I

Ten parts of phosphorous trifluoride-$P^{32}$, a gas, containing 10 microcuries of radioactivity are passed through a 3 inch diameter stainless steel tube which contains near the center of the four foot length a cigar. A similar amount of the radioactive labeled compound is passed through a scrupulously clean similar tube. Both tubes are flushed briefly with dry nitrogen and then the radioactivity along the length of each tube is determined. The tube containing the preexisting contamination, that is, the cigar, exhibits appreciably higher radioactivity than does the previously scrupulously clean tube.

Example II

Dry nitrogen gas is introduced slowly at the bottom of a tower one meter in length containing 3-chloro-1-iodobenzene-$I^{131}$ of a specific acitivity of 3.0 mc./mM. held at ambient temperature, and the effluent gas containing a small amount of the radioactive labeled material as vapor is led from the top of the tower through a scrupulously clean 2 inch stainless steel pipe and valve assembly and thence into a similar previously scrupulously cleaned pipe and valve assembly into which has been introduced in the valve seat 10 mg. of S.A.E. #50 crankcase oil. After approximately 15 minutes a significant amount of radioactivity is observed in the effluent gas and passage of the gas is continued for another five minutes.

Monitoring of the outside of both pipe and valve assemblies shows a relatively high amount of radiation and a somewhat greater amount near the previously contaminated valve seat. Flushing of the system with pure dry nitrogen is continued until the effluent gas shows a marked lowering of radioactivity. Subsequent similar monitoring of the assemblies shows a relatively low count along the length of the assemblies except that the area near the contaminated valve seat still exhibits appreciable activity. Flushing with dry nitrogen is then continued until background levels are observed along the control pipe and valve assembly. The contaminated valve seat continues to exhibit a high amount of radioactivity which is caused by the absorption by the crankcase oil of significant amounts of the radioactive labeled material.

When this experiment is repeated using 100 mg. of crankcase oil instead of the 10 mg., a significantly greater amount of radioactivity is detected near the contaminated valve seat. When this experiment is again repeated using an unknown amount of crankcase oil as the contaminant, an intermediate amount of radioactivity is detected near the contaminated valve seat. Removal of the contaminant present in the last instance by washing with trichloroethylene and evaporation of the trichloroethylene solvent showed that approximately 65 mg. of oil had been added.

Example III

Into a previously cleaned nickel tank which has inside measurements of 36 inches length by 6 inches diameter evacuated to approximately 1 mm. of mercury pressure is introduced dry air saturated with perchloroethylene and 50 microcuries of 2,3-dibromo-1-propanol-$Br^{82}$. The perchloroethylene is used in this example to increase the solubility of the radiochemical in possible hydrocarbon contaminants. Flushing of the tank with dry air until substantially no activity is detected in the effluent gas is followed by examining the tank with a scintillation counter. Substantially no residual activity is observed from within the tank.

Then 15.6 mg. of machine oil dissolved in methylene chloride is added to the tank, and with turning and rocking to achieve a more even distribution, the methylene chloride is removed by evacuation and evaporation. The resultant contaminated tank has approximately 20 micrograms of machine oil per square inch of inside surface area. Into the evacuated tank is again introduced dry air saturated similarly with perchloroethylene and 50 microcuries of 2,3-dibromo-1-propanol-$Br^{82}$. Flushing of the tank with dry air is carried out for a similar period of time. Significant amounts of activity are now observed over the whole tank when measured externally with a scintillation counter and the total amount of radioactivity contained in the effluent gases is less than that present at the start.

When this experiment is carried out without the perchloroethylene a somewhat lesser amount of radioactivity is noted following flushing with dry air.

When the tank is filled to less than one atmosphere with the radioactive gas lesser amounts of activity are retained on the walls by the contamination. When the tank is pressurized to greater than atmospheric pressure, for example, to two atmospheres or even higher, a greater amount of radioactivity is retained by the contaminant other conditions being held constant. Similar results are obtained when vessels made of plastic or synthetic polymers are tested as above.

Example IV

One microcurie of decyl bromide-1-$C^{14}$ of specific activity of 0.62 mc./mM. dissolved in one milliliter of methylene chloride is placed in a small aluminum boat in one end of a scrupulously clean copper pipe of one and one half inches diameter and dry nitrogen gas is then passed over the liquid surface and thence through the pipe until substantially all of the methylene chloride solvent has evaporated. Measurement with a Geiger counter ratemeter of residual activity on the inner surface at the end from which the effluent gases are led indicates that no increase of radioactivity over background levels is observed.

When this experiment is repeated using the same equipment but with a small amount of grease smeared over the inside of the pipe and away from the boat, a significant amount of activity is absorbed by the grease. Thus, the background level prior to the start of the experiment showed less than 15 counts per minute whereas the count adjacent to the greased end showed a value in excess of 65 counts per minute following the gradual evaporation by the carrier gas of the methylene chloride.

When this experiment is carried out with other carrier gases such as argon, carbon dioxide, perfluorocyclobutane, dichlorodifluoromethane, and the like similar results are obtained. When other surfaces such as aluminum, steel, nickel, glass, plastic, baked clay and the like are used rather than copper, similar results are obtained. Also when other configurations of copper such as valves, tanks, flanges, tubes, connectors, and the like are used in place of or in addition to the pipe, similar results are observed.

Example V

Dry air is passed slowly through a clean stainless steel pipe 6 inches in diameter and 10 feet long containing at the inlet end a small stainless steel boat into which has been placed 3-iodosilicobenzoic acid-$I^{131}$, the entire assembly having been heated to 60° C. Following evaporation of the radioactive labeled material and reduction of the activity in the effluent gas to substantially background levels, only background levels of radioactivity are detected along the length of the pipe when measured externally with a suitable scintillation counter assembly. When this procedure is repeated exactly, except that 1 g. of finely divided sand is placed internally near the center of the pipe, significant radioactivity is detected adjacent to the small sand pile, thereby permitting detection of the location of the sand contaminant.

In other tests powdered or loose inorganic materials, such as iron oxide, are detected in the same manner using a compound such as iron pentacarbonyl $Fe^{59}$.

Materials which are normally gaseous, liquids, or solids at room temperature are valuable in the practice of my invention, provided that the given compound possesses an appreciable vapor pressure and is capable of being used as a pure gas or as a gaseous component together with one or more carrier gases. For any given system to be examined for the presence of possible contaminants, radioactive labeled compounds are chosen which are more compatible with probable contaminants than with the surface material; for example tetrabromoethane-$C^{14}$ present as a vapor at its equilibrium vapor pressure in the presence of a carrier gas such as nitrogen, helium, or the like is used to detect hydrocarbon contaminants on metal surfaces since the radiochemical has a marked affinity for hydrocarbons in contrast to a relatively low affinity for metal.

While solvents are not an essential part of this invention, it is to be appreciated that their use is advantageous in certain instances to increase the solubility, the rate of solution, and/or the adsorption or absorption of the gaseous radioactive labeled compound on or in the contaminant to be detected. In addition the presence of solvent vapor tends to increase the efficiency of the deposition on all surfaces. Many solvents may be used such as tetrachloroethylene, low boiling petroleum ether, butanol, perfluorocyclobutane, methylene chloride, ethanol, acetone, formic acid, ethyl ether and the like.

Many different types of propellents or carrier gases may be used with the vapor of the radioactive compound. In addition to those mentioned above are octafluorocyclobutane, dibromodifluoromethane, nitrous oxide, butane and the like. Normally it is desired to use non-flammable materials such as the polyhalogenated materials. Included among these are monofluorotrichloromethane, chloroform, carbon tetrachloride, dichloromethane, monochloromonofluoromethane, 1,1 - difluoropropane, 2,2-difluoropropane, among others. Of such, those which normally are gases at room temperature are preferred.

When two or more types of contaminants may be encountered it is of advantage to use two, three, or more particular radioactive labeled materials of such a nature that one is absorbed more strongly by the first type of contaminant while the second is absorbed more strongly by the second type of contaminant and the third is absorbed more strongly by the third type of contaminant and so forth. Thus, when attempting to locate contaminants such as hydrocarbon grease, carbohydrate, and protein simultaneously three or more radioactive labeled materials such as 1,1,2,2-tetrabromoethane-$Br^{82}$ for the grease, 1,2-ethylene glycol-$C^{14}$ for the carbohydrate, and iodoacetic acid-$I^{131}$ for the protein may be used in the practice of my invention in the same carrier gas and the radiations identified individually by means of suitable detection devices such as Geiger-Mueller, solid state, and scintillation counting devices coupled with channel analyzers. This technique permits the detection of the location, the type, and the relative amount of each contaminant quickly and conveniently since the radiations emitted by the various isotopes differ in energy levels and can be counted independently of each other. It is of advantage, of course, to determine accurately in advance of such unknown determinations the relative affinity of the various types of contaminants for the various types of radioactive labeled materials since each contaminant will absorb to a greater or lesser degree each of the radioactive labeled materials. It is seen herein that it is possible to detect contamination in systems of pipes, valves, and the like using my inventive process by means of comparing the amount of detectable radioactivity with previously determined backgrounds and through use of controls at the time the determinations are made.

As to the detection devices mentioned above any suitable detector of radiation may be used. For most purposes a Geiger-Mueller tube and associated equipment are acceptable and convenient. When the geometry of the system of surfaces demands, special instruments permitting the measurement of beta radiation inside complex enclosures, such as complex metal tubes, are used. These various counters may be used externally or as probes moving within the enclosures being tested.

In the practice of my invention normally ambient temperatures and reasonable pressures are used although higher and lower temperatures and higher and lower pressures can also sometimes be used to advantage. For example, pressures higher than atmospheric are used to increase the sensitivity of this test procedure by increasing the absolute amount of radioactive labeled material which may be charged into the system being examined and thereby causing a greater degree of absorption. Lower pressures than atmospheric may also be used to achieve an increased sensitivity under certain conditions, for example by decreasing the absorption by one type of contaminant in greater degree than by another type of contaminant. The use of higher temperatures is of advantage when it is desired to increase the rate of absorption of the radiochemical and to increase the amount of the radioactive material in gaseous form when the vapor pressure is normally low. Lower temperatures are used for opposite effects. In general the higher the specific activity of the radioactive labeled material the greater the sensitivity of the test. Thus, a radiochemical with a specific activity of 3.0 millicuries per millimole is absorbed by a given contaminant in the same absolute amount as a material of 0.3 millicurie per millimole since the absorption is a function of the chemical composition of the radioactive labeled material, the time of exposure, the nature of the contaminant, and other factors but is not a direct function of the amount of radioactivity; all other conditions being the same, ten times as much radioactivity will be exhibited by the same contaminant when exposed to 3.0 mc./mM. material than to 0.3 mc./mM. material. It is readily seen therefore that the greater the specific activity the less the weight of radiochemical is required to give the same amount of radioactivity.

In general it is desirable to use specific activities in excess of 1.0 millicurie per millimole and preferably in excess of 3.0 millicuries per millimole. For example, 1,1,2,2-tetrabromoethane-$C^{14}$ at a specific activity of 3.5 mc./mM. has 0.01 microcurie in each microgram of material and this level is readily detectable. Thus, my inventive method provides a process for the detection of contaminants down to 1 microgram per square inch and even lower.

Compounds which are useful in the practice of my invention are those materials having significant vapor pressure at normal temperatures so that they may be brought into contact as a gas or gaseous component with possible contaminants and thereby be absorbed preferentially by contaminants in comparison to the material of the surface on which the contaminant is present. The materials may be normally gaseous, liquid, or even solid at room or ambient temperature but they must exert significant vapor pressure at the temperatures and pressures under which the exposure of the contaminant is carried out. The following list of compounds is intended to demonstrate the wide diversity of materials which fit this description but is not intended to limit the invention in any way. Thus methyl iodide-$I^{131}$, phenyl iodide-$I^{131}$, paradichlorobenzene-$C^{14}$ (or $Cl^{36}$), 1,1,2,2-tetrabromoethane-$C^{14}$ (or $Br^{82}$), 1,2-diiodoperfluorocyclobutane-$I^{131}$, 3,5-dichloro-1-iodobenzene-$I^{131}$, 1,1,2 - trichloro - 2 - bromoethane-$Br^{82}$, naphthalene-$C^{14}$, n-decyl bromide-1-$C^{14}$, tetrachloroethylene-$C^{14}$ (or $Cl^{36}$), trimethyl phosphate-$P^{32}$, phenyldichlorophosphine-$P^{32}$, 1,1,4,4-tetrafluoro-1,2,3,4-tetrabromobutane-$Br^{82}$, phosphorous trifluoride-$P^{32}$, thionyl chloride-$S^{35}$, sulfuryl chloride-$S^{35}$, dimethyl sulfide-$S^{35}$, iodine monochloride - $I^{131}$, 1,1,2 - trichloro - 1 - bromo - 2 - iodoethane - $I^{131}$, 2,3 - dibromo - 1 - propanol - $Br^{82}$, 3 - hydroxypropionitrile - 1 - $C^{14}$, iodoacetic acid - $I^{131}$, methoxy acetic acid-$C^{14}$, 1,3-propandiol-$C^{14}$, iodoacetic acid-$C^{14}$, 1,1,2 - tribromobutane - $C^{14}$, ethyleneglycol - $C^{14}$, glycol diacetate-$C^{14}$, nonanol-1-$C^{14}$ and others are suitable. The above materials are used normally to detect material of organic nature, that is containing carbon and carbon skeletons. When it is of advantage to detect the presence of inorganic materials such as sand or rust, radioactive labeled materials which are largely inorganic or have marked affinity for the contaminant but not for the surfaces on which the contamination is located are selected such as: tetraethylsilicane-$C^{14}$, 3-iodosilicobenzoic acid-$I^{131}$, omega-bromopropyltrichlorosilane-$Br^{32}$, iron pentacarbonyl-$Fe^{59}$, ferric chloride hexahydrate-$Fe^{59}$, ferrocene-$Fe^{59}$, and the like.

While various factors as temperature, pressure, rate of gas flow, amount of flushing, specific activity, among others, affect the results, these conditions are canceled out by the use of the controls as described above or by calibration systems. Reference may be made to graphs or curves to correct for variations. Detection systems may be so constructed that such factors as temperature and pressure are manually or automatically taken into account when the process is being operated. Similarly, the operator will, by the empirical approach, determine how much of a given radioactive compound is picked up by a known amount of a given contaminant. Knowing these controls the operator will be able to judge not only the presence of contaminant but the kind and the amount as well as the location. Removal of contaminants can be then made, the removal can be checked and it can be determined when the apparatus is ready for the next step for which it is designed, as, for example, the introduction into it of liquid oxygen. This invention is also applicable to the handling of other materials including hydrogen peroxide, hydrazine, unsymmetrical dimethylhydrazine, nitrogen tetroxide, liquid hydrogen, liquid fluorine and the like.

It is to be appreciated also that this invention may employ measurement of differences in the activity of the influent and effluent as shown in Example III above. To illustrate, using the equipment and chemicals described in Example IV above one fits at one end of the tube to be tested an inlet in sealed relationship with the tube and at the other end an outlet in similar relationship. The inlet and outlets are pipes through which the radioactive gas has been passed until the sections are in equilibrium. Usually they measure the same, having been made to be exact counterparts and having been similarly cleansed and exposed. Under these conditions with the inlet and outlet in sealed relationship with the tube to be tested, the gaseous radioactive mixture of Example IV, or others of this invention, is passed through the inlet, then through the tube and then through the outlet. If the counters on the inlet and outlet show the same values after correcting the value shown by the outlet for normal pick-up by a clean tube as determined by control runs, one concludes that the tube under test is clean. However, if after the correction the outlet value is still below that of the inlet the operator knows that the tube contains a contaminant. Again, by controls and calibration, he can determine the kind and amount of contaminant. Differences between the count of the influent and effluent may be in the order of 100% or more or may be only in the order of a few percent, but the reference to the controls are relied upon to translate the difference into measures of contaminant. While the method does not show the precise location of the contaminant, the method is very useful when vessels having intricate shapes are involved, for such shapes make probing difficult. Also, this method affords the measurement of total contamination in a complete system.

The processes of this invention are useful in many ways. They are used to detect the presence of non-metallic and other contamination and, particularly organic contamination on the surface of metal plates, valves, tanks and containers, pipes and tubes, and of other metal shapes and of complex systems of these metal shapes. The contamination detected by the invention process herein described is not in general directly determinable by other means. The use of the invention herein described is especially important when the surfaces so examined are used for the storage or transfer of materials which react violently with the contaminants so detected since the process permits the determination not only of the level of contamination but also permits the establishment and determination of realistically acceptable levels of contamination to prevent the possibility of violent reaction.

The processes and compositions of this invention are useful in evaluating missile systems and space exploration vehicles. They are also applicable in electroplating, testing metal to metal bonding procedures and in testing for contaminants in medical equipment such as tubes, sutures, hypodermic needles, among others and in oxygen equipment that is to be used for breathing to make sure it is contaminant-free. The radioactive gaseous materials or mixtures are advantageous in that they are not contaminating materials for they are readily removed and are used in very small amounts. Further, they usually are not frozen, as are liquid testing materials, upon the introduction of liquid oxygen, nor do they present disposal, drainage, seepage or spillage problems as do the liquids. The compositions and processes of this invention afford efficient, economic, valuable measurements which can be made in very short time periods.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A process for detecting contamination held by a surface which process comprises exposing the surface to be tested to a gaseous radioactive-labeled material and effecting thereby the retention of some of said material by the said contaminant; removing unretained material; determining the effect of the said retention by measuring radio-active emissions using a radiation detector and similarly measuring radioactive emission under control conditions in the absence of any contaminant; and then determining the amount of contamination held by the said tested surface by comparing the emissions therefrom to the emissions obtained under control conditions.

2. A process in accordance with claim 1 in which said radio-active material comprises a non-radioactive carrier gas and at least one radiochemical.

3. A process in accordance with claim 1 in which emissions coming from contaminated areas are measured and compared to emissions from corresponding uncontaminated areas in the control.

4. A process in accordance with claim 1 in which the effect of the said retention is determined by measuring the decrease in the radioactivity of the said gaseous radioactive-labeled material after its use in said exposure.

5. A process in accordance with claim 1 in which said labeled material comprises a non-radioactive carrier gas containing at least one radiochemical.

6. A process in accordance with claim 1 in which said exposure is effected under pressure.

7. A process in accordance with claim 1 in which removal of unretained material is effected in part by use of a vacuum.

8. A process in accordance with claim 1 in which said labeled material includes a gamma-emitter.

9. A process in accordance with claim 1 in which said labeled material contains an $I^{131}$ atom.

10. A process for the determination of contamination comprising exposing a surface and any contaminant it may have to a gas containing a radiochemical; contacting the said surface and any contaminant it may have with the said gas to effect adsorption of the radiochemical by any contaminant present; removing the said gas and any non-adsorbed radiochemical; removing a portion of any adsorbed radiochemical; similarly exposing and treating a control surface containing no contaminant and measuring emissions after this said exposure and treatment; and detecting contamination on said test surface by measuring the amount and position of radioactivity coming therefrom and comparing the emission to the emission measured in said control.

References Cited by the Examiner

UNITED STATES PATENTS

| | | | |
|---|---|---|---|
| 2,520,058 | 8/1950 | Reichertz | 250—106 |
| 2,957,989 | 10/1960 | Hull | 250—106 |
| 2,968,733 | 1/1961 | Dvorkovitz | 250—106 |
| 3,014,054 | 12/1961 | Fries | 250—106 |
| 3,019,342 | 1/1962 | Brooke | 250—106 |

OTHER REFERENCES

An article entitled "Fighting Flux Contamination," Electronic Industries, vol. 18, No. 11, pages 110, 245 and 246.

Linder: Abstract of application Serial No. 90,331, published Feb. 27, 1951, 643 O.G. 1333.

Super Sleuths Trace Flow of Injected Gas by Welge, The Oil and Gas Journal, Aug. 29, 1955, pages 77 to 79.

Using Tracers In Refinery Control by Hull, Nucleonics, vol. 13, No. 4, April 1955, pages 18 to 21.

RALPH G. NILSON, *Primary Examiner.*